US011182616B2

(12) United States Patent
Mulligan et al.

(10) Patent No.: US 11,182,616 B2
(45) Date of Patent: Nov. 23, 2021

(54) SYSTEM AND METHOD FOR OBTAINING IMAGE CONTENT

(71) Applicant: Sony Interactive Entertainment Inc., Tokyo (JP)

(72) Inventors: Paul Terrence Mulligan, Hatfield (GB); Ashley Sanders, Rickmansworth/Herts (GB); Sashikanth Reddy Dareddy, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/690,748

(22) Filed: Nov. 21, 2019

(65) Prior Publication Data
US 2020/0184225 A1    Jun. 11, 2020

(30) Foreign Application Priority Data

Dec. 5, 2018  (GB) ........................... 1819865
Aug. 7, 2019  (GB) ........................... 1911284

(51) Int. Cl.
*G06K 9/62*    (2006.01)
*G06K 9/00*    (2006.01)
(Continued)

(52) U.S. Cl.
CPC ........ *G06K 9/00718* (2013.01); *A63F 13/335* (2014.09); *A63F 13/40* (2014.09);
(Continued)

(58) Field of Classification Search
CPC .. G06K 9/00718; G06K 9/00751; G06K 9/46; G06K 9/6259; G06K 9/6263;
(Continued)

(56) References Cited

U.S. PATENT DOCUMENTS 5,718,632 A      2/1998 Hayashi
2002/0122058 A1  9/2002 Kutaragi
(Continued)

FOREIGN PATENT DOCUMENTS

WO  2017066029 A1  4/2017
WO  2018106461 A1  6/2018

OTHER PUBLICATIONS

Treehouse, How to Make a Loading Screen in Unity, Treehouse Blog, Nov. 3, 2015, 13 pages, downloaded from https://blog.teamtreehouse.com/make-loading-screen-unity on May 13, 2021. (Year: 2015).*

(Continued)

*Primary Examiner* — Yanna Wu
(74) *Attorney, Agent, or Firm* — Matthew B. Dernier, Esq.

(57) ABSTRACT

A system for obtaining image content includes a receiving unit configured to receive video frames generated during the execution of a video game at a video game playing device, a monitoring unit operable to detect at least some of the video frames as corresponding to a loading screen, a content unit configured to obtain pre-generated image content for displaying in place of or addition to the video frames identified as corresponding to loading screens, a control unit configured to receive an input from the monitoring unit, and in response said input, select pre-generated image content for displaying in place of or in addition to the video frames detected as corresponding to a loading screen, and a display unit operable to display the selected pre-generated image content in place of or in addition to the video frames detected as corresponding to a loading screen.

11 Claims, 8 Drawing Sheets

(51) Int. Cl.
| | |
|---|---|
| *A63F 13/533* | (2014.01) |
| *G06K 9/46* | (2006.01) |
| *A63F 13/335* | (2014.01) |
| *A63F 13/40* | (2014.01) |
| *A63F 13/63* | (2014.01) |
| *A63F 13/86* | (2014.01) |
| *H04N 21/845* | (2011.01) |
| *H04N 21/8549* | (2011.01) |

(52) U.S. Cl.
CPC ............ *A63F 13/533* (2014.09); *A63F 13/63* (2014.09); *A63F 13/86* (2014.09); *G06K 9/00751* (2013.01); *G06K 9/46* (2013.01); *G06K 9/6259* (2013.01); *G06K 9/6263* (2013.01); *H04N 21/8456* (2013.01); *H04N 21/8549* (2013.01); *G06K 2209/01* (2013.01)

(58) Field of Classification Search
CPC ... G06K 2209/01; A63F 13/335; A63F 13/40; A63F 13/533; A63F 13/63; A63F 13/86; H04N 21/8456; H04N 21/8549
See application file for complete search history.

(56) References Cited

U.S. PATENT DOCUMENTS

| | | |
|---|---|---|
| 2003/0154367 A1 | 8/2003 | Kawai |
| 2016/0019598 A1 | 1/2016 | David |
| 2017/0065889 A1 | 3/2017 | Cheng |
| 2017/0157512 A1 | 6/2017 | Jeiyilong |
| 2017/0228600 A1 | 8/2017 | Syed |
| 2018/0018852 A1* | 1/2018 | Riggs ...................... A63F 13/48 |
| 2019/0179795 A1* | 6/2019 | Huang ...................... G06N 3/10 |
| 2020/0016495 A1* | 1/2020 | Cruz .................. H04L 65/1069 |

OTHER PUBLICATIONS

Combined Search and Examination Report for corresponding Application No. GB 1911284.6, 5 pages, Jan. 29, 2020.
Future US Inc, 2018, "Fallout 76 plains photo mode loading screens are a little moment of memory making brilliance", gamesradar.com [online], Available from: https://www.gamesradar.com/fallout-76-loading-screen/, 13 pages, dated Nov. 5, 2018.
Fandom, "Entry Screen" GTA.fandom.com, [online] Available from: https://gta.fandom.com/wiki/Entry _Screen, 1 page, dated Jan. 28, 2020.
Combined Search and Examination Report for corresponding Application No. GB1819865.5, 5 pages, May 2019.
Partial European Search Report for related Application No. EP19208016.6, 16 pages, Jan. 31, 2020.
Thibeault Christopher et al., "System for game enhancement using scene recognition in emulated consoles", 2016 IEEE International Conference On Systems. Man. And Cybernetics, pp. 4141-4147, Oct. 9, 2016.
Marczak Raphael et al., "Postprocessing Gameplay Metrics for Gameplay Performance Segmentation Based on Audiovisual Analysis" IEEE Transactions on Computational Intelligence and AI In Games, vol. 7, No. 3, pp. 279-291, Sep. 1, 2015.
Communication Pursuant to Article 94 (3) for related Application No. EP19208016.6, 5 pages, dated Aug. 11, 2021.
Examination Report for corresponding Application No. GB1911284.6, 3 pages, dated Sep. 8, 2021.

* cited by examiner

SYSTEM AND METHOD FOR OBTAINING IMAGE CONTENT

BACKGROUND OF THE INVENTION

Field of the Invention

The present disclosure relates to a system and method for obtaining pre-generated image content. In particular, the present disclosure relates to a system for automatically detecting loading screens in video games and providing image content that may be displayed in place of, or in addition to, the loading screen.

DESCRIPTION OF THE INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Typically, in video games, players are presented with loading screens. Loading screens usually comprise an image that is displayed to a viewer whilst a computer program is loading or initializing. In the context of video games, a player may be presented with a loading screen in response to attempting to access a new or different part of a virtual environment. For example, a loading screen may be used to disguise the length of time taken to retrieve assets such as maps, models and textures from a location in memory.

Most loading screens provide users with indication of the progress in initializing or loading the relevant part of the video game. It is also common for loading screens to provide supplementary information relating to the video game being played, such as hints and tips as to how various situations within the video game may be approached. In some video games, loading screens are used as an opportunity to share artwork created by a video game artist.

In most video games, players are able to capture screenshots of their gameplay, using for example a 'share button'. These screenshots can then be shared with other players using social networks such as the PSN Activity Feed, Reddit, Twitter, Facebook and the like. Social networks such as these usually allow users to provide feedback in relation to screenshots (e.g. upvote, heart, like, etc.), with screenshots having the most positive feedback usually being the easiest to find and view.

Currently, user-created screenshots are not easily accessible when playing a video game. Typically, a user will have to leave or suspend the video game they are playing and seek out the screenshots using a different application running at their games console, or even a separate device. As will be appreciated, seeking content this way is somewhat intrusive to a player's overall game playing experience. Moreover, the lack of integration between a video game application and content sharing application may result in a user being less likely to engage with a video game's share functionality. For example, a user may simply be unaware of the screenshot functionality, or the creativity that is possible with such a feature. Generally, there is scope for further incentivising users to create and share content from video games, whilst ensuring that this content is shared with relevant users.

The present invention seeks to alleviate at least some of these problems.

SUMMARY OF THE INVENTION

It is to be understood that both the foregoing general description of the invention and the following detailed description are exemplary, but are not restrictive, of the invention.

The present disclosure is defined by the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
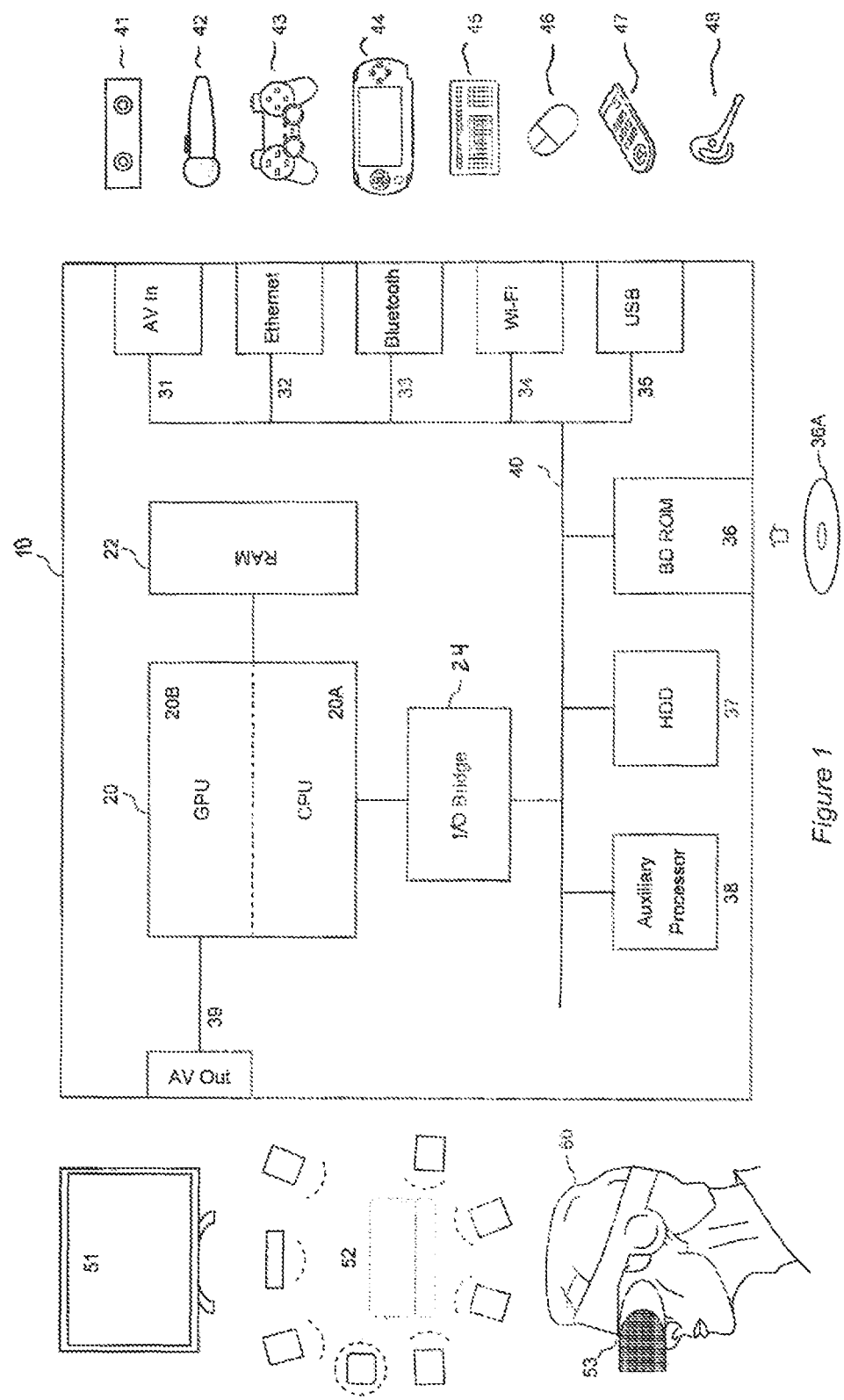
FIG. 1 shows schematically an example of a video game playing device.

Referring now to the drawings, wherein like reference numerals designate identical or corresponding parts throughout the several views, a system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

A system that may employ the method(s) described herein may include a server or a similar or similar general-purpose computer running suitable software instructions encapsulating the method(s), and operated by a service provider to which a video game playing device owned by a user may connect, for example via a network such as the Internet. Typically the server or general-purpose computer will be responsible for collecting data from a plurality of video game playing devices and using this to train an artificial intelligence (as will be described below). Generally, this training of the artificial intelligence will be achieved using one or more graphics processing units (GPU) or tensor processing units (TPU).

Once trained, the artificial intelligence may be exported to a video game playing device. This may be provided as, for example, a software update with the trained artificial intelligence being downloaded to the video game playing device as part of the software update. Additionally or alternatively, the trained artificial intelligence may be accessed by a video game playing device via e.g. an internet connection. The artificial intelligence may correspond to a trained model, or a software module at which the trained model can be accessed.

Alternatively or in addition, the system may comprise the videogame playing device owned by the user. Alternatively or in addition, both the videogame playing device and the server may operate cooperatively to implement the method (s) or the videogame playing device may implement the method(s) locally.

The trained AI may be game specific as a result of having been trained using data generated during the playing of a specific video game. In such a case, access to the trained AI may only be permitted if a player is detected as having the video game for which the AI has been trained. In some cases, it may be beneficial to provide the trained AI separately to the game code itself, to ensure that the AI can easily be updated (e.g. re-trained) without affecting the rest of the game.

As an example of a videogame playing device, FIG. 1 schematically illustrates the overall system architecture of a Sony® PlayStation 4® entertainment device. It will be appreciated that the device shown in FIG. 1 is just an illustrative example, and that in some embodiments, the entertainment device may include a next generation console, such as a Sony® PlayStation 5 ® device.

A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. 25 The APU 20 has access to a random access memory (RAM) unit 22.

The APU 20 communicates with a bus 40, optionally via an I/O bridge 24, which may be a discrete component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, 5 or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable 10 entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a microphone, speakers, mobile phone, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features 25 and to select games and optionally other content.

When playing a video game playing device such as that shown in FIG. 1, a player may wish to capture screenshots of their gameplay. For example, it may be that a virtual environment is particularly aesthetically pleasing at a time corresponding to 'sunset' in the video game, or that a player is in the process of performing an impressive feat such as delivering the final blow to an enemy in a boss battle. Some video games, such as e.g. God of War™, provide a special 'photo mode' in which players can control the pose of a virtual camera, as well as the facial expressions of the protagonist, the lighting and any special effects. Screenshots generated via a game's photo mode are usually of the highest artistic quality. Screenshots captured by players are commonly shared on social networks, such as e.g. the PSN activity feed or subreddits or twitter accounts dedicated to specific video games or brands of games console.

As mentioned previously, capturing interesting screenshots typically requires a user to interact with e.g. a 'share button' whilst playing the video game. On the PS4, for example a user is required to press the 'share' button, in order to capture a screenshot of whatever is displayed on the screen at that moment. By pressing and immediately releasing the share button, a user is presented with the option of immediately sharing the screenshot to Facebook, Twitter or their PSN Activity Feed. Alternatively, a user can access their screenshots in a separate 'Capture Gallery' (accessible from the 'Home Menu') and share them from there (i.e. later).

Players may wish to share their screenshots on social networks (or more generally, image-hosting platforms) so as to gain exposure for their content, and to obtain user feedback in the form of e.g. 'likes', 'upvotes', 'loves' and comments. However, when accessing shared content, players are typically required to pause or suspend a video game application, and to access the shared content via the application used to host the content (e.g. via Reddit, Facebook, Twitter, etc.). As will be appreciated, accessing shared content in this way is disruptive to a player's video game experience. Moreover, the process of having to seek out shared content independently of the video game application may result in a user not engaging with the share functionality, or simply forgetting such functionality is available. Even where content is shared by a player, it may be that such content is not always shared to a relevant audience, and so the exposure and feedback a player is able to obtain is limited.

It would be desirable if appropriate moments within a video game could be identified for displaying shared content to a player, whilst minimizing the disruption caused by displaying such content. Moreover, it would also be desirable if players could be provided with bespoke content shared by other players, with the content being relevant to that player or at least known to be popular with the relevant gaming community. In this way, players may become more aware of the kind of content that can be captured using the share functionality and so potentially become more inclined to using it themselves. It would be further desirable if players could give feedback on content that is presented to them, to enable the quality of shared content to be determined and shared more often with players of a given video game.

Figure 2:
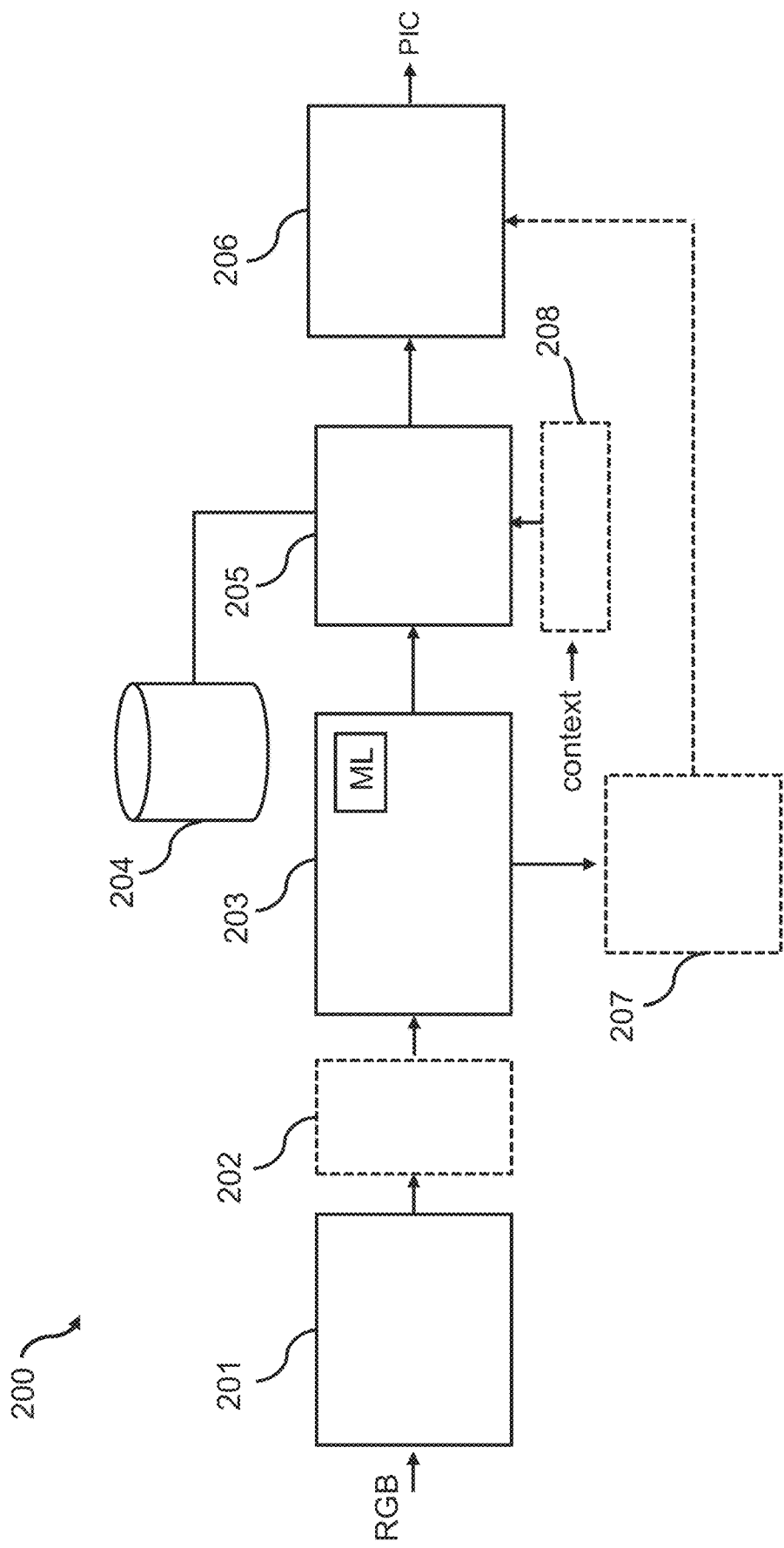
FIG. 2 shows schematically an example of a system for obtaining pre-generated image content in accordance with the present disclosure.

Referring now to FIG. 2, an example of a system 200 for obtaining image content in accordance with the present disclosure is described.

The system 200 comprises a receiving unit 201 configured to receive video frames generated during the execution of a video game at a video game playing device. The video frames may comprise RGB or YUV frames, which may be received as part of a video file (e.g. .MPEG4) that also includes a corresponding audio signal (e.g. a '.wav file'). The audio signal may be removed for the video file before or after having been received at the receiving unit 201.

The receiving unit 201 may include a video buffer, such as a ring buffer, that enables video frames output by the video game playing device to be sampled. The video frames may be sampled at 2 or 5 frames per second, for example. In some examples, the video frames may also be downsized, for example, from 1280 (width)×720 (height) pixels to 398 (width)×224 (height) pixels, prior (or after) being received at the receiving unit 201. In FIG. 2, the receiving unit 201 is shown as receiving RGB frames; it will be appreciated that is a non-limiting illustrative example.

In some examples, the system 200 may comprise a feature extractor 202 that is arranged to receive the video frames (received at the receiving unit 201) and to generate feature representations of each sampled video frame. The feature extractor 202 may comprise a pre-trained model, such as e.g. DenseNet, ResNet, MobileNet, etc.) that receives the video frames as an input and is pre-trained to output a feature representation of the input video frames. In FIG. 2, the feature extractor 202 is shown in dashed since in some embodiments, feature representations of the received video frames may not be generated; instead, the frames themselves may be input to the trained monitoring unit 203.

In FIG. 2, it can be seen that the system 200 further comprises a monitoring unit 203 for detecting at least some of the video frames received at the receiving unit 201 as corresponding to a loading screen. In embodiments of the disclosure, the monitoring unit 203 comprises a machine learning model that has been trained to identify video frames that correspond to loading screens. The video frames, or their respective feature representations may be provided as inputs to the monitoring unit 203. The machine learning model may comprise a neural network, such as, for example, a convolutional or recurrent neural network (CNN or RNN). However, any suitable machine learning system 200 may be considered.

In some examples, the monitoring unit 203 has been trained using semi-supervised learning so as to identify different types of scene that the video frames generated by the video game playing device correspond to. It has been found by the inventors that the use of semi-supervised learning enables the monitoring unit 203 to be trained significantly faster than compared with the use of supervised learning only. The training of the monitoring unit 203 will be described in more detail, later (see section: 'Training the ML model').

In some examples, the monitoring unit 203 is trained with images generated during the playing of a specific video game or genre of a video game. Generally, the types of scene that may occur during the playing of a specific video game will be less varied for a single game compared with different video games, and so it may be more expedient to train the monitoring unit 203 with video images generated during the playing of a specific video game. An example of a machine learning model that may be used for detecting different types of scene within a given video game is described in patent application GB1819865.

In some examples, the monitoring unit 203 is configured to detect whether a video frame for a specific video game corresponds to gameplay, cut-scenes, maps, menus and loading screens. The ways in which these types of scene may be detected will be discussed later (see section: 'Training the ML model').

In FIG. 2, the monitoring unit 203 is shown as receiving an input from the receiving input; this input may correspond to the video frames (sampled and down-sized as appropriate) received at the receiving unit 201. In some embodiments, the monitoring unit 203 is executed locally at the video game playing device.

Alternatively or in addition, the monitoring unit may detect that at least some of the video frames received at the receiving unit 201 as corresponding to a loading screen using other methods. In particular, reading of a threshold volume of data from an optical disk, disk drive or internet port may be indicative of loading a game. Similarly, a lack of image motion (or only whole-screen motion such as panning, zooming or rotation) may be indicative of a loading screen, and can be identified from inter-image deltas (difference images, motion vectors or other descriptors of inter-image motion). Again similarly a reduction in the volume of draw lists, texture loads, polygons or the like, and/or a constant number (e.g. to within a threshold of variation) may indicate a static or slowly evolving screen. Again, a lack of user inputs, or user inputs characteristic of game play, may be indicative of loading. As discussed elsewhere herein, detection of motion (particularly circular motion) only in a single section of the screen (for example near a corner) may be indicative of a common iconography for loading (see loading icon 404 in FIG. 4). Similarly, slow linear motion in a single section of the screen (for example near the bottom) may be indicative of another common iconography for loading (see loading bar 401 in FIG. 4). Other indicators may also be considered such as OCR detection of the phrase 'Loading' or its equivalent.

One or more of these indicators of a loading screen may be used by a monitoring unit to detect that at least some of the video frames received at the receiving unit 201 correspond to a loading screen. Where two or more of these indicators are used (e.g. loading data and limited screen motion), this may reduce the scope for a false-positive detection.

The monitoring unit may use one or more such indicators as inputs to a suitably trained machine learning system, or alternatively or in addition may use the one or more indicators directly to detect a loading screen (e.g. the presence of a threshold amount or duration of loading data and a small rotating region in an otherwise substantially static screen) may be taken to detect a loading screen.

The system 200 further comprises a content unit 204 configured to obtain pre-generated image content for displaying in place of, or in addition to the video frames identified as corresponding to loading screens. The pre-generated image content may correspond to screenshots or videos of video game gameplay captured by players (preferably, different to a player that is currently using the system 200 to play a video game). The pre-generated image content may correspond to the same or a different video game to that for which video frames are being received at the receiving unit 201. The pre-generated image content may be retrieved from e.g. an image-hosting platform or database on which such content is stored. The monitoring unit 203 may be located at for example a video game playing device (such as that described previously in relation to FIG. 1) and be in communication with one or more servers at which the pre-generated image content is stored. The connection between the video game playing device may be achieved via a communications network such as the Internet, for example. The content unit 204 may correspond to a temporary buffer in which the retrieved pre-generated content is temporarily stored, prior to being selected for display in response to the detection of a loading screen.

In some examples, it may be that screenshots or videos captured by users whilst playing video games are stored at a proprietary database (e.g. a PSN database, located at one or more servers) and that the content unit 204 is configured to access and retrieve these screenshots or videos in response to e.g. a user having initiated a video game playing session. In this way, the pre-generated image content is available for display before a user is presented with a loading screen, and so there is no (or less of a) delay in presenting this content to a user. As the power of CPUs and GPUs continues to improve, it is expected that loading times will generally decrease, and so the retrieval of content for displaying in place of, or in addition to, the loading screen will need to be fast.

In alternative or additional examples, the pre-generated image content may relate to marketing material; for example, the pre-generated image content may include information about e.g. in-game items, such as skins, that can be purchased for the current video game and a current price of those items; the current price and any sales relating to downloadable content (DLC) for the current video game being played, or other different video games; events, such as e.g. e-Sports tournaments, relating to the video game being played, etc. Again, this information may be stored (and updated) at a server and accessed and retrieved as appropriate by the video game playing device.

In the present disclosure, pre-generated image content is primarily described as corresponding to screenshots of a video game captured by players. It will be appreciated that this is just an example, and that other types of pre-generated image content, such as videos may also be displayed to players. In some cases, it may be preferable to display screenshots since these will be of a relatively small size (compared with video or animation) and are less likely to interfere with the loading time that a given loading screen is trying to disguise.

The system 200 also comprises a control unit 205 configured to receive an input from the monitoring unit 203, and in response to said input, select pre-generated image content for displaying in place of or in addition to the video frames detected as corresponding to a loading screen. The input received from the monitoring unit 203 provides an indication as to whether a video frame received at the receiving unit 201 corresponds to a loading screen. In response to the detection of a loading screen, the control unit 205 is configured to select a user-generated screenshot or video for displaying in place of, or in addition to, the video frames detected as a loading screen. The criteria used for selecting the pre-generated image content will be discussed in further detail, later.

In embodiments where the monitoring unit 203 is configured to detected different scene types in the received video frames (e.g. 'gameplay', 'cut-scenes', 'inventory', 'map', 'loading screen'), the control unit 205 may be configured to instruct the display unit 206 to cease displaying the selected pre-generated image content in response to detecting that the scene type of the received frames no longer corresponds to 'loading screen'. For example, the monitoring unit 203 may detect that the frames being output at the display have changed from 'loading screen' to 'gameplay' or 'cut-scene' and may instruct the display unit 206 to cease displaying the e.g. screenshot that was selected for display. In this way, it can be ensured that the user is able to engage with the video game as soon as possible and is not presented with pre-generated image content for longer than is necessary. Generally, the monitoring unit 203 will be trained to detect scene-types in near-real time; hence, any delays in detecting a change of scene type should be negligible. The display unit may correspond to any display device that is suitable for displaying video images.

In FIG. 2 it can be further seen that the system 200 comprises a display unit 206 operable to display the selected pre-generated image content in place of or in addition to the video frames detected as corresponding to a loading screen. The display unit 206 may be configured to display the selected pre-generated image content so as to occupy all of the available display area of the display unit 206. Alternatively, the display unit 206 may be configured to display the selected pre-generated content at a portion of the display area of the display unit 206, for example, at a portion overlaid on top of a central region (occupying e.g. 75%) of the display area.

In some situations, it may be desirable to not obscure some parts of a loading screen. For example, where the loading screen includes a progress bar and a user may still wish to see this in addition to any screen shots or videos that are being presented to the user. In such examples, the system 200 may include an element identification unit (not shown) operable to identify a portion of the received video frames that correspond to the progress bar. The progress bar may be detected based on e.g. metadata that is received in addition to the received RGB or YUV frames; or based on e.g. an analysis of changes in colour and/or pixel intensity within regions of the received video frames. The display unit 206 may then display the selected pre-generated image content at a location that does not obscure the progress bar. In examples where the pre-generated image content occupies the entire display area, the element identification unit may be configured to crop the part of each video frame identified as corresponding to the progress bar and to superimpose this on top of the pre-generated image content that has been selected for display.

As mentioned previously, some loading screens provide users with tips and insights as to how different video game situations may be approached. For such loading screens, it may be desirable to ensure that this information is still visible to the user. Hence, in some embodiments, the system 200 may further comprise a text identification unit 207 operable to perform an optical character recognition (OCR) process on the video frames detected as corresponding to a loading screen, so as to extract one or more strings of characters from these video frames. The strings of characters extracted from the loading screen frames may then be converted into a different format (e.g. machine-encoded text) which can then be re-rendered and superimposed on top of the pre-generated image content selected for display. The text may be displayed on top of the selected pre-generated image content or above, below, or to the side, depending how the pre-generated image content is to be displayed.

An example of a service that may be used for performing the OCR is 'AWS Rekognition'™. For example, video frames sampled by the receiving unit 201 may be fed to the 'AWS Rekognition'™ service, with any extracted text being fed back to the display unit 206 for displaying at a display area. It will be appreciated that the OCR process need not be performed on each frame received at the receiving unit 201. It may be sufficient to detect the text in a first frame corresponding to a loading screen, and to cease the OCR process after this initial detection. The display unit 206 may be configured to cease displaying the extracted and re-rendered text in response to a detection of gameplay having resumed, i.e. the loading screen no longer being displayed to a player.

Figure 3:
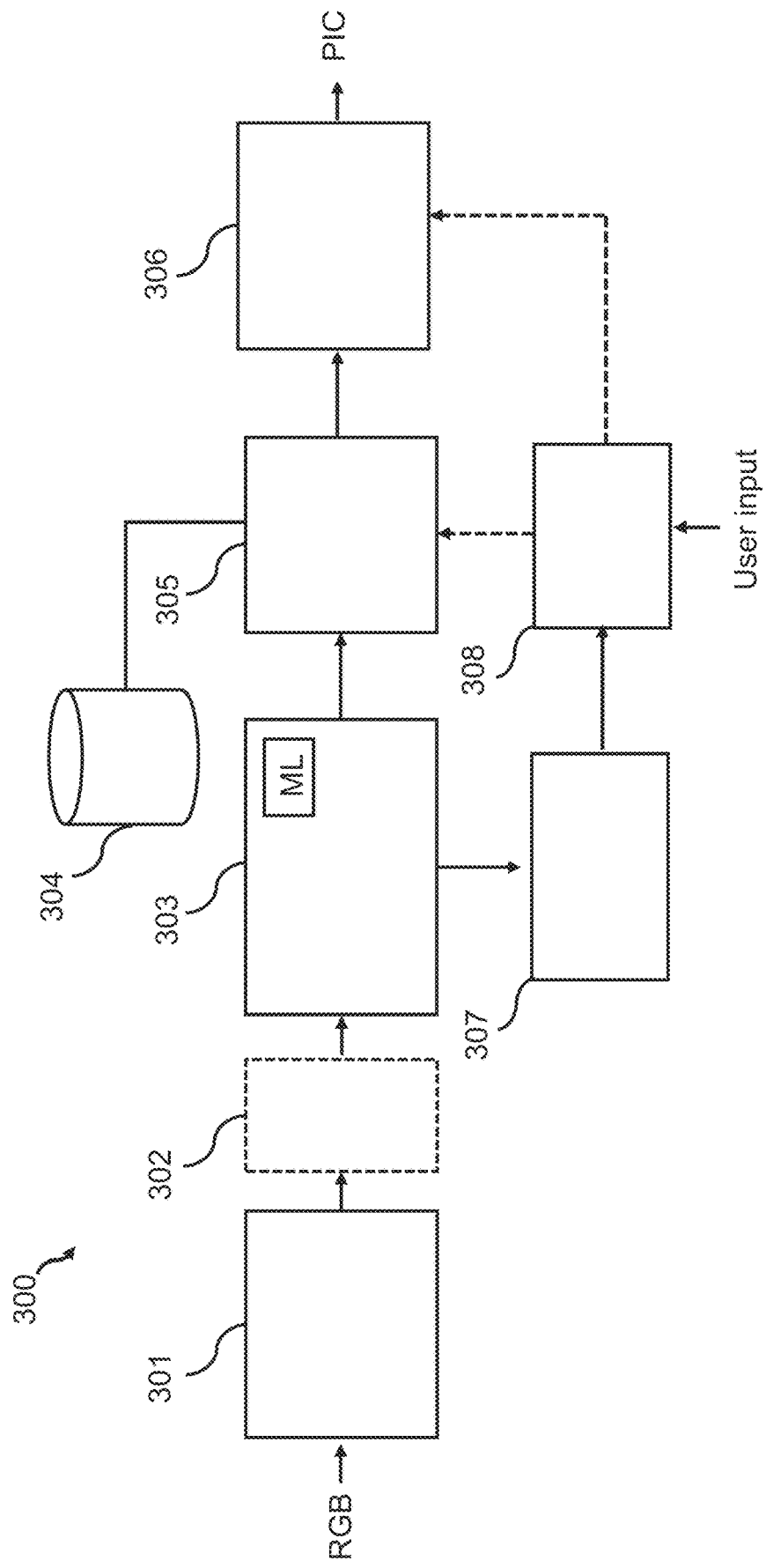
FIG. 3 shows schematically an example of a further system for obtaining pre-generated image content in accordance with the present disclosure.

In some embodiments, it may be desirable to give a user the option as to whether pre-generated image content is to be displayed to the user. FIG. 3 shows schematically an example of a system 300 for providing users with this option. In FIG. 3, the system 300 comprises a receiving unit 301, feature extractor (optional) 302, monitoring unit 303, content unit 304, control unit 305 and display unit 306. These components may correspond to the components described previously in relation to FIG. 2. As in FIG. 2, the system 300 is shown as receiving RGB frames as an input and providing pre-generated image content (PIC) as an output.

In FIG. 3, the system 300 also comprises a notification unit 307 operable to receive an input from the monitoring unit (indicating the detection of a loading screen) and responsive to receiving said input, generate or obtain a notification for displaying in addition to the video frames generated by the video game playing device. In some examples, the notifications may be generic and so stored in memory as part of an application that comprises the monitoring unit. It may be desirable to give the player this control over whether the selected content is actually displayed where e.g. this information relates to marketing material.

In FIG. 3, the system 300 also comprises a user input unit 308 operable to receive a user input indicating that the user has interacted with the notification generated by the notification unit 307. The user input may correspond to e.g. a button press at a games controller (e.g. the 'x' button on DualShock™ 4), speech signal, motion gesture, detected via any suitable means. The display unit 306 may be configured to display the selected pre-generated image content only in response to a user having been detected as interacting with the generated notification.

Alternatively, the control unit may be configured to retrieve pre-generated image content (e.g. a screenshot) in response to the user input received at the user input unit 308.

In FIG. 3, the user input unit 308 is shown as providing an input to the control unit and display unit 306, since either of these units may be used to control whether pre-generated image content is output to the user. The inputs are shown in dashed, since an input from the user input unit 308 may be received at either or both of the control unit and display unit 306. In some examples, it may be that the display unit 306 only outputs the selected pre-generated image content in response to receiving an input from the user input unit 308.

In FIG. 3, there is no text identification unit and context unit (described below). This so as to avoid cluttering the diagram. It will be appreciated that the system 300 described in FIG. 3 may comprise one or both of these components, arranged and operating in the manners described in the present disclosure.

Figure 4:
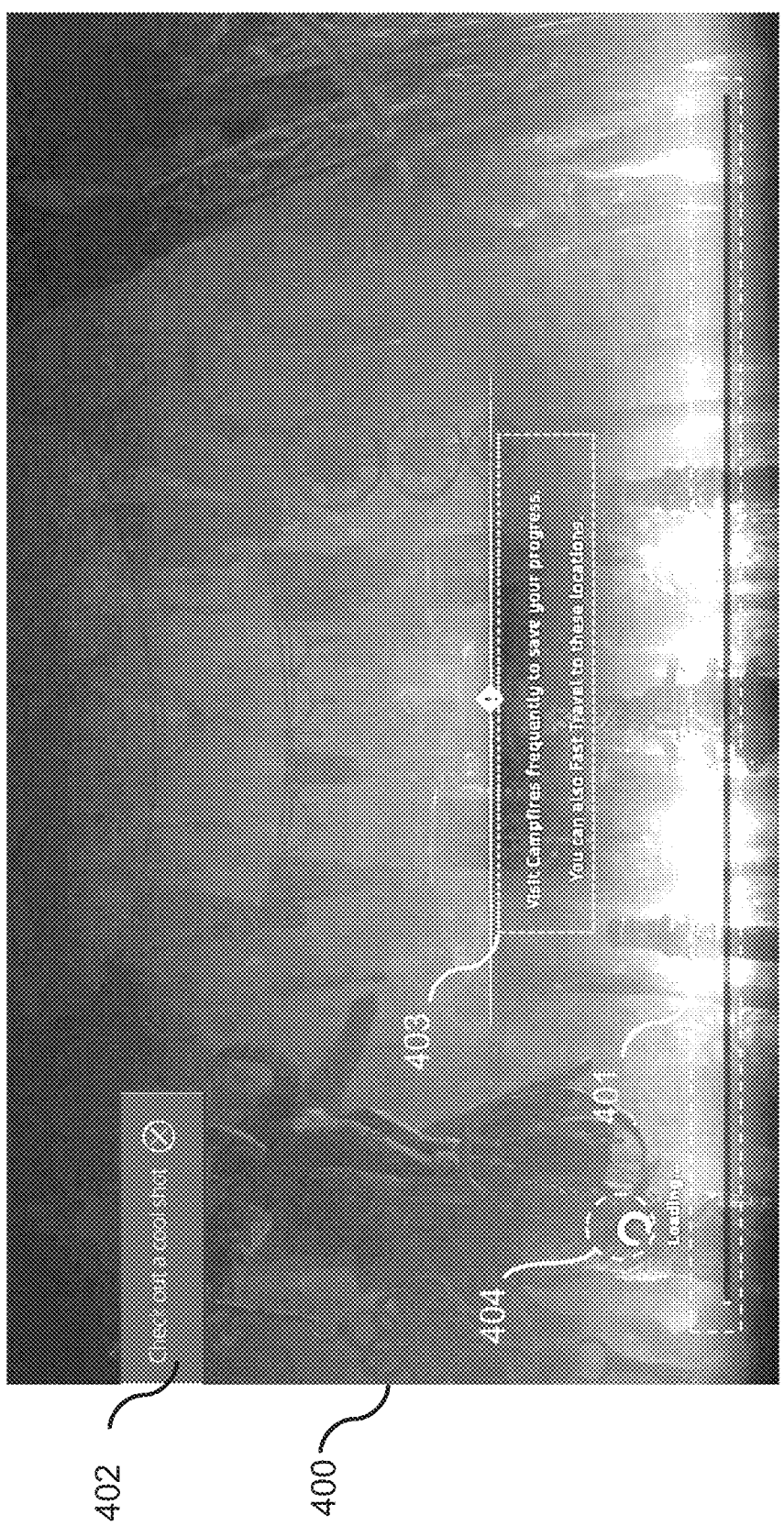
FIG. 4 shows schematically an example of a loading screen and various visual elements contained therein.

FIG. 4 shows an example of a loading screen 400 in the video game Horizon Zero Dawn™, where the progress bar is shown as visual element 401 and the user notification is shown as visual element 402. In FIG. 4, the notification includes the text 'check out a cool shot' along with an indication of a user input that is required in order to view the 'cool shot'. In FIG. 4, it can also be seen that a tip is provided at a lower central region of the video frame 403 (i.e. "Visit Campfires frequently to save your progress . . . "). The previously described OCR process may be applied to this video frame so as to identify the strings of characters corresponding to this text, so that the text can be extracted and superimposed on top of the selected pre-generated image content. In FIG. 4, a visual element in the form of a sweeping circle 404 is also shown. This sweeping element provides a user with further feedback that the video game is being loaded. It will be appreciated that FIG. 4 is a non-limiting example of a loading screen that may be detected by the system (and method) of the present disclosure.

In some examples, the system 200, 300, may further comprise a feedback unit (not shown) operable to receive user feedback in relation to pre-generated image content that is (or has) been displayed to a player. For example, the feedback unit may be configured to generate a visual element corresponding to e.g. a 'thumbs up', 'up arrow', 'like', that a user can select so as to indicate whether they like or, optionally, dislike the pre-generated image content that has been presented to them. This visual element may be displayed with the pre-generated image content that has been selected for display.

The feedback unit may be configured to provide the feedback received in relation to a (displayed) piece of pre-generated image content to e.g. a central database at which the pre-generated image content is stored. This feedback can then be stored as metadata in association with the content and used to determine whether to present the content in the future to other players, for example. Initially, the selection of pre-generated image content may be random, with users being provided the option of giving feedback in relation to the content that they are presented with. Over time, the feedback received in relation to the pre-generated image content may be used to ensure that only the highest quality (artistically speaking) content is presented to users. In this way, players will be presented with the best e.g. user-captured screenshots and will not have to seek these out in potentially niche sub-pages of social networks that are separate from the video game application.

In some cases, the most popular art may be tracked on e.g. a weekly basis, such that, for a given video game, the most 'liked' or 'upvoted' content for that video game is displayed as part of the video game's landing page. In this way, players of a given video game can be kept up to date with the latest and best user-generated content being shared for that video game. This also ensures that players are not inundated with content that they have seen previously.

Figure 5:
FIG. 5 shows schematically an example of a video frame for which the image content corresponding to a loading screen has been replaced with a screenshot.

FIG. 5 shows an example of a loading screen that has been replaced with a screenshot 500 taken from the game Red Dead Redemption™. In FIG. 5, it can be seen that the screenshot 500 occupies the entire video frame. In addition, it can be seen that text extracted via an OCR process is shown at a central region of the video frame, along with a 'sweeping' circle that sweeps as the video game is loading. In FIG. 5, the extracted text and sweeping circle are shown in a partially transparent box 502. At the bottom right hand corner, it can also be seen that two visual elements 504 in the form of a 'thumbs up' and 'thumbs down' icon, are provided. A user may provide feedback in relation to a displayed screenshot by selecting the icon that is relevant to them. Whilst graphical icons are shown in FIG. 5 for providing user feedback, it will be appreciated that the system need not be limited in this respect. For example, a user may provide feedback via speech (e.g. saying 'Like!'), performing a physical gesture (e.g. a 'thumbs up'), pressing a pre-designated button on their controller, etc. The feedback unit may be configured to receive feedback in any of these formats, with the feedback being detected via any suitable means.

In some examples, pre-generated image content that the user has provided positive feedback for may be stored in association the user's account, such that the user can access their history of 'liked' screenshots. As will be appreciated, this enables a user to revisit screenshots that they have liked, without having to try and find them at some other site or waiting for them to re-appear in place of a future loading screen. In some examples, the pre-generated image content may be associated with metadata such as an identifier for the player that captured the content (e.g. screenshots). This identifier may be provided to a player that 'liked' the content so as to enable the player to a view profile associated with the author. The author's profile may include e.g. other screenshots captured by the author, which may also be of high artistic quality. In this way, a player can easily discover user-generated content of high-artistic quality. The screenshots captured by different users may be provided as part of e.g. the PS network, which allows players to the view the profiles of other players (subject to privacy settings).

In alternative or additional embodiments, the control unit 205, 305 may be intelligent in how it selects pre-generated image content for displaying to users. In such embodiments, the system 200, 300 may comprise a context unit 208 operable to obtain user context information indicating at least one of (i) the video game that the video frames received at the receiving unit correspond to and (ii) a player progress associated with a current player to which pre-generated image content is to be displayed. It will be appreciated that the context unit is only illustrated in FIG. 2 but may also be included in the system of FIG. 3.

The context unit 208 may be configured to receive an indication (e.g. an identifier) of the video game being played as e.g. metadata that is provided with the RGB or YUV frames being generated by the video game playing device. The indication of video game may be received from e.g. one or more processors at the video game playing device that are configured to detect (or 'read') the video game that a player is currently playing.

The player progress may be received from a location in memory at the video game playing device and/or from one or more servers at which player progress is stored (typically as a back-up to the local storage of such data). The context unit 208 may be configured to request this information at periodic intervals or on a near real-time basis. Alternatively, the receiving unit 201, 301 may be configured to automatically provide the context unit 208 with this information, e.g. in response to a user beginning a video game session. Generally, a player's progress may not increase significantly for say, 10 minute intervals, and so it may be sufficient to poll this data at sparser time intervals.

The player progress may correspond to e.g. a percentage of the game objectives that a player has completed and/or a percentage of a virtual world that a player has visited. It may be desirable to monitor a player's progress when selecting pre-generated image content to ensure that a given player is not presented with spoilers.

The pre-generated image content may also be associated with corresponding context information (e.g. screenshot context information). For example, for each piece of content (e.g. screenshot), the video game that the content corresponds to and/or a player progress associated with the player that captured the content may be stored as metadata in association with the content. In such embodiments, the control unit 205, 305 may be configured to select a screenshot for display based on a comparison of the context information obtained for the user and the context information associated with at least some of the pre-generated image content. In this way, the control unit 205, 305 may select pre-generated image content that is identified as corresponding to the same video game and optionally, a part of the video game that the player has or has not yet encountered. For example, the control unit 205, 305 may be configured to select screenshots that correspond to the same video game, but do not correspond to parts of the video game that the player has not yet encountered, so as to avoid spoilers.

As mentioned previously, in some examples, the monitoring unit 203, 303 may be configured to detect cut-scenes. Cut-scenes may be more prone to spoilers since these tend to relate to pivotal moments in a video game's story. Hence, in some embodiments, the monitoring unit 203, 303 may be configured to receive screenshots selected by the control unit 205, 305, and to determine whether any of these correspond to cut-scenes and a part of the video game that the player has not (or is not likely to have) encountered. In response to determining that a screenshot does satisfy this criteria, the monitoring unit 203, 303 may instruct the display unit 206, 306 to not display the screenshot. Moreover, the monitoring unit 203, 303 may instruct the control unit 205, 305 to select one or more different screenshots for display.

In some examples, the content unit 204, 304 (at which pre-generated image content is stored) may have access to an instance of the monitoring unit 203, 303 and may determine periodically whether any of the screenshots corresponds to 'cut-scenes' (or more generally, a type of scene that the screenshots correspond to). The content unit 204, 304 may then label the stored screenshots with metadata indicating whether or not a given screenshot corresponds to a 'cut-scene'. If the player progress of the player that captured the screenshot is also stored in association with the screenshot, i.e. at the time they captured the screenshot, then the control unit 205, 305 may select screenshots that are known not to correspond to cut-scenes and which were captured by players with similar progress to that of a current player playing the same video game.

It will be appreciated that, in some examples, it may be desirable to select pre-generated image content that corresponds to a different video game to that being played. For example, it may be desirable to show players screenshots for other video games that they own or video games that they could purchase. In this way, the selected screenshots may act as an advertisement for other video games. The user context information may thus be used to select screenshots corresponding to different video games, so as to pique the user's interest in relation to those video games.

Training the ML model

Figure 6:
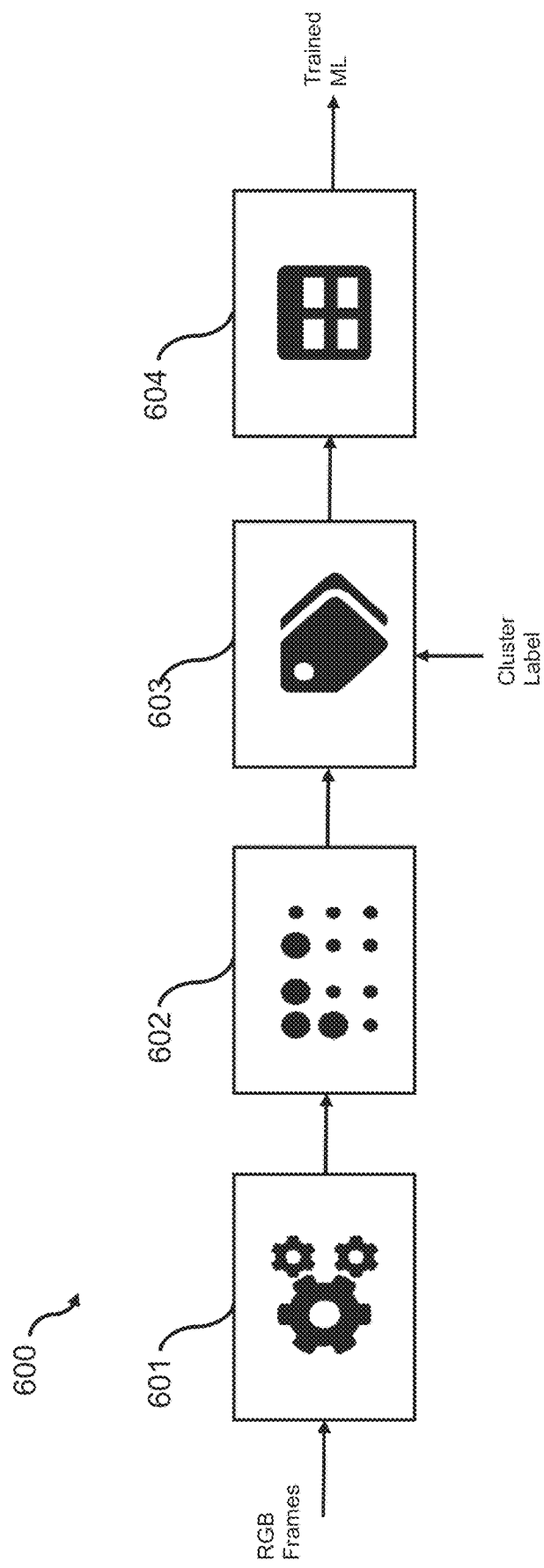
FIG. 6 shows schematically an example of a system for training the machine learning model of the present disclosure.

FIG. 6 shows schematically an example of a system 600 for training the machine learning model of the monitoring unit 203, 303.

In FIG. 6, the system 600 is shown as comprising a feature extractor 601 for receiving video frames generated during previous video game sessions. The video frames may correspond to video frames generated during the playing of the same video game as that for which the machine learning model is to be used on, once trained. These video frames may be obtained from e.g. YouTube™ or Twitch™, where videos of players playing through substantive portions of video games are readily available. It has been found by the inventors, for example, that 15 hours of playthrough footage for the game Horizon Zero Dawn™ (corresponding to approximately 300,000 frames) was sufficient in training the machine learning model to recognize different types of scene occurring within that particular video game.

The previously generated video frames may be generated by multiple different players and provide representative coverage of the whole video game or different events that may occur within the video game. For some games, it may be possible to collect as few as 2-5 videos, so long as those videos cover a sufficient extent of the possible gameplay.

The feature extractor 601 may be configured to generate feature representations of the previously generated video frames by inputting at least some of the RGB or YUV video frames in the previously generated video signal into a pre-trained model, such as e.g. DenseNet, ResNet, MobileNet, etc.

The system 600 further comprises a clustering unit 602 operable to receive the feature representations output by the feature extractor 601 and to use unsupervised learning to sort the received feature representations into a plurality of clusters. The feature clustering unit 602 may be configured to use k-means or mini-batch k-means clustering for performing said clustering. It has been found by the inventors that either of k-means and mini-batch k-means clustering is particularly well suited to clustering video frames generated during the playing of a video game. This is because the number of visual events that can occur in a video game are typically limited and repetitive, and so can easily be clustered to a relatively high degree of accuracy.

In some embodiments, the clustering unit 602 may be further configured to filter at least some of the feature representations from the identified clusters. This may involve, for example, removing feature representations from a respective cluster that exceed a threshold distance from the centroid of that cluster. For example, the top 10% of RGB or YUV frames closest to a respective cluster centroid may be selected as being representative of the visual event that the data in that cluster corresponds to. It may be that a larger number of RGB or YUV frames fall beyond the top-10% in terms of distance to their respective clusters, and so are not used when training the machine video machine learning model.

The system 600 also comprises a labelling unit 603 operable to generate labels for the clusters output by the clustering unit 602 based on an input received from a user. Each label indicates a type of scene associated with the frames or corresponding feature representations in a respective cluster. The user input may correspond to the manual inputting of a label by a developer or data scientist with respect to a given cluster of video frames (or corresponding feature representations). For example, it may be that, following the clustering operation, a developer is required to review e.g. 50 RGB frames in each cluster, so as to determine a label that is representative of that cluster.

Once a label has been given to a given cluster, all of the frames within that cluster may inherit the assigned label. For example, it may be possible to determine that a cluster corresponds to e.g. 'gameplay' based on a review of the video content for that cluster. By labelling the cluster as corresponding to 'gameplay', all of the frames (or feature representations of the frames) be identified as corresponding to 'gameplay'. As will be appreciated, labelling frames in this way is considerably quicker than having to go through thousands, or even hundreds of thousands of frames and manually labelling each frame with a corresponding label. It has been found by the inventors that a sufficient amount of training data can be obtained within 1-2 hours by labelling clusters in this way.

As mentioned above, at least some of the video frames may be filtered from each cluster; hence, the frames that are reviewed by the developer may correspond to those that are within the threshold distance of a centroid of a given cluster.

In some examples, k-means or mini-batch k-means clustering may be used with k set to a value of 20, resulting in 20 clusters being detected for the video frames (i.e. training images). The labelling unit 603 may be configured to remove and/or merge different clusters, based on whether those clusters correspond to the same type of scene, or are unlikely to be of interest in terms of detection. For example, there may be multiple clusters corresponding to 'gameplay'. A developer or data scientist reviewing the frames for such clusters may assign the same label (i.e. cluster ID) to each cluster, such that these are no longer associated with different cluster IDs. In some cases, it may be sufficient to label clusters as corresponding to either 'loading screen' or 'not loading screen'. It was found by the inventors that for 15 hours of Horizon Zero Dawn footage, with a value of k=20, only one cluster was identified as corresponding to 'loading screen'. Hence the burden on identifying different clusters as corresponding to 'loading screen' and 'not loading screen' may be relatively low.

However, in some cases, it may be desirable to have more granularity, with cluster labels corresponding to e.g. 'gameplay', 'cut-scene', 'map', 'inventory', 'loading screen', 'miscellaneous', etc. It may be useful to be able to detect these different scene-types to ensure that screenshots corresponding to e.g. maps, inventory, loading screens, etc. are not selected for displaying to a player in place of, or in addition to, a loading screen currently being presented to a user. As mentioned above, it may be that screenshots are initially selected at random from a central database for presenting for a user, and so the quality associated with these may not necessarily be known. By training the monitoring unit to identify the different scene types, a filtering step can be performed on the screenshots, to ensure only those that are likely to be of interest to a player, are selected for display.

Moreover, it is desirable to detect when a loading screen is no longer being displayed to a player, to ensure that the pre-generated image content is no longer displayed to the player. For example, it may be desirable to cease display of a selected screenshot in response to 'gameplay' having been detected.

It will be appreciated that a different value of k may be used in the k-means or mini-batch k-means, depending on the level of granularity that is desired for detecting different events (corresponding to different clusters) within the signals of the previously generated video game data.

Figure 7:
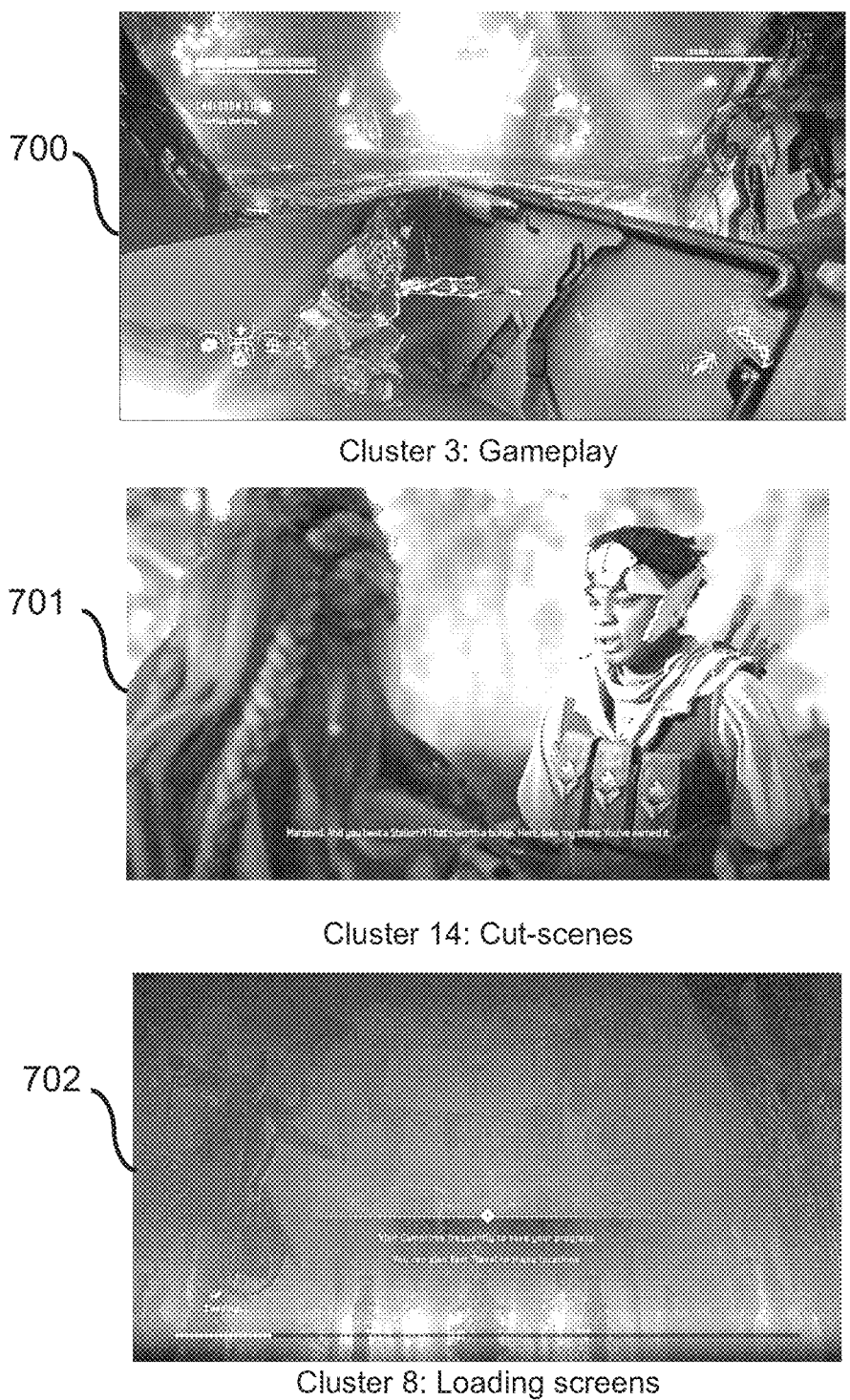
FIG. 7 shows an example of frames representative of three clusters identified during training of the machine learning model of the present disclosure.

FIG. 7 shows an example of video frames identified as belonging to different clusters for the game Horizon Zero Dawn™. In FIG. 7, the first, second and third video frames 701, 702, 703 correspond to clusters identified as corresponding to 'gameplay', 'cut-scenes' and 'loading screens' respectively.

Returning to FIG. 6, the system 600 also comprises a training unit 604 that is configured to train the machine learning model of the monitoring unit 203, 303. The training unit 604 is configured to determine a relationship between the frames or feature representations input to the machine learning model and the corresponding labels generated by the labelling unit 603. In this way, the machine learning model is trained to predict a label for the frames or feature representations input to the machine learning model. The training unit 604 may comprise e.g. a neural network (CNN or RNN) that is to be trained with the video frames or feature representations thereof. Training the neural network may involve, for example, inputting 75% of the labelled data to the neural network, and then using the remaining 25% of the video frames for validation.

The training unit 604 may be located at one or more servers (e.g. forming 'the cloud') on which the machine learning model is to be trained. The video frames (generated during previous playing of a video game) or feature representations generated therefrom, and the respective labels may be uploaded to the one or more servers. Once the machine learning model is sufficiently trained, it may then be exported to the monitoring unit 203, 303 described previously.

In some embodiments, the machine learning model may not be trained with feature representations of the video frames generated during previous video game session. Rather, once the labels have been determined for the video frames in a given cluster (as described above), it may be that the video frames, along with the corresponding labels, are input to the machine learning model.

Training the model in this way can be advantageous in that the machine learning model can be trained in a more bespoke manner. For example, generating feature representations using a pre-trained model such as e.g. DenseNet may be inefficient because the pre-trained model will likely have been trained using thousands of images that have no relevance to a particular video game. As a result, the use of such a pre-trained model may be excessive in terms of the memory required to store it and the time taken to execute it (requiring the use of a GPU, for example).

It may therefore be desirable to ensure that DenseNet is not required, once the model has been trained. This may be achieved, for example, by using DenseNet for the purposes of clustering, but then training e.g. a neural network with the video (RGB or YUV) and the corresponding labels generated as above. This would then mean that the trained model could take the video frames as inputs, along with the corresponding labels, without the input video and audio frames first having to go through e.g. DenseNet.

The monitoring unit 203, 303, once trained, may be installed at the video game playing device as part of a separate application, e.g. a 'SnapShare' application. The application may be considered as 'separate' in that it is separate from a video game application that is being used to render or output the frames of the video game. As mentioned previously, the 'SnapShare' application may be specific to a particular video game, series or genres of video games. The 'SnapShare' application may be configured to constantly monitor the video frames being rendered or output by the video game application. The 'SnapShare' application may run in the background, whilst being in communication with the video game application. In response to detecting a loading screen, the SnapShare application may be configured to replace the loading screen with a screenshot that is has selected in accordance with the present disclosure. This may involve, for example, pushing its output to the display unit 206, 306 and optionally, instructing the video game execution to cease outputting the rendered video frames. In response to detecting that the video frames output by the video game application correspond to 'gameplay' (or more generally, 'not loading screen') the 'SnapShare' application may be configured to close and return to operating as a background process.

It will be appreciated that the above-described systems may be implemented at one or more computing devices as a method, with a computer readable medium having computer executable instructions adapted to cause the computing device(s) to perform steps of the method. The steps of the method may be implemented by corresponding components of the above-described systems.

Figure 8:
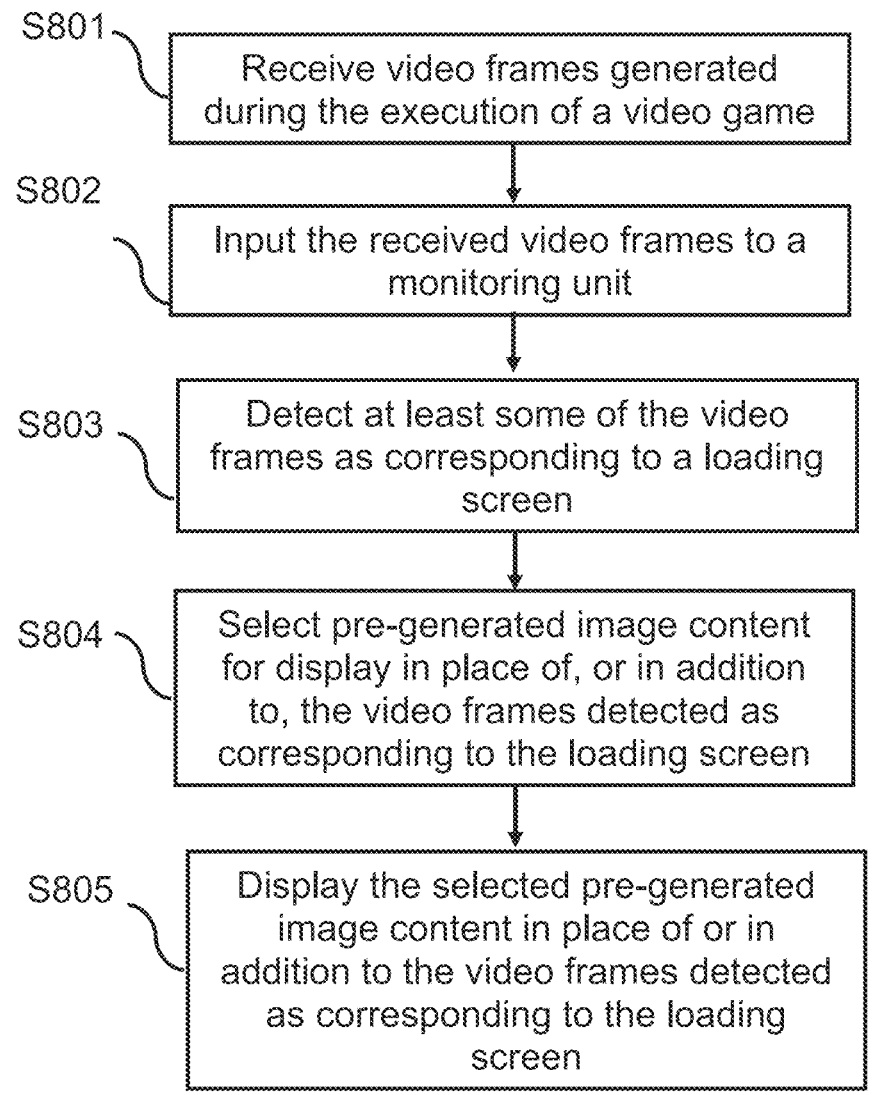
FIG. 8 shows an example of a method for obtaining pre-generated image content in the present disclosure.

FIG. 8 shows an example of a method for obtaining pre-generated image content in accordance with the present disclosure.

At a first step S801, video frames generated during the execution of a video game are received. These frames may be received at, for example, a communication interface of a video game playing device. The video frames may be received from e.g. the GPU of the video game playing device being used to play the video game.

In some examples, it may be that the video frames are rendered via a cloud gaming service, and so the frames may be received at the video game playing device via a communications network (to which the video game playing device is connected). In cloud-gaming examples, the video game playing device may correspond to a display device. As described previously, the video frames may be sampled at e.g. 2 or 5 frames per second by a video buffer.

More generally, step S801 may involve receiving video frames that correspond to video game footage. For example, the frames need not be generated in real-time by a video game playing device. Rather, they may simply correspond to a recording of playing of a video game that is hosted at e.g. a video-hosting platform such as e.g. YouTube, Twitch, etc.

At a second step 802, the received video frames are input to a monitoring unit, which as noted previously may comprise a machine learning model. If used, the machine learning model has been trained to detect at least some of the received video frames as corresponding to a loading screen. As mentioned previously, in some examples, feature representations may be generated for each received (i.e. sampled) video frame, and these feature representations may be provided as the input to the machine learning model.

In some examples, the model may be trained using semi-supervised learning so as determine a relationship between the video frames input to the model and corresponding scene types. The model may be trained with video frames generated during previous playing of the same video game (or similar video games).

The machine learning model corresponds to the machine learning model used by the monitoring unit, as described previously. The machine learning model may be trained in any of the previously described manners.

At a third step S803, at least some of the received video frames are detected as corresponding to a loading screen. The detection of whether video frames correspond to a loading screen is based on the output of the machine learning model. The output of the machine learning model may correspond to label indicating a type of scene that each received video frame corresponds to. The labels may correspond to 'loading screen' and 'not loading screen', although in some examples, there may be a higher level of granularity. For examples, the labels may include 'loading screen', 'game-play', 'cut-scene', 'menu', 'inventory', 'map', etc.

At a fourth step S804, pre-generated image content is selected for display. The pre-generated image content is selected for display in place of, or in addition to, the video frames detected as corresponding to the loading screen. The pre-generated image content may be obtained from a central database or image-hosting platform at which such content is stored. The central database may correspond to a PS Network database at which screenshots captured by PlayStation players are stored. The image-hosting platform may correspond to e.g. 'Reddit', 'Imugr', 'Flickr, 'Twitter', 'Facebook', etc. The video game playing device may have access to the database or image-hosting platform via e.g. the Internet. It may be preferable to retrieve the image content from the PS Network database, since there may be less variation in format of the content captured by players. For example, the PSN database may store screenshots 'as captured' and so be less prone to needing re-formatting.

In some examples, step S804 may comprise retrieving and storing pre-generated image content in a temporary buffer at the video game playing device, such that the content is readily available for presenting to a player, during a video game session.

The pre-generated image content may correspond to a screenshot captured by a different player to that currently playing the video game. The screenshot may pertain to the same, or a different video game. In some examples, the pre-generated image content may provide information about downloadable content (DLC) or other content that the player may wish to access. The information may include e.g. a current price of the DLC or other content.

In some examples, the method may further comprise obtaining user context information indicating at least one of: (i) a video game that the received video frames correspond to and (ii) a player progress associated with the player for which video frames are being received (step S801). This information may be obtained in any of the manners described previously. The pre-generated image content may also be associated with metadata indicating at least one of: (i) a video game associated with the pre-generated image content and (ii) a player progress associated with the player that capture the content (e.g. screenshot). The pre-generated image content and corresponding metadata may be stored at the central database or image-hosting platform, for example. Step S804 may comprise selecting the pre-generated image content based on a comparison of the user context information and metadata associated with the pre-generated image content stored at the central database or image-hosting platform. As described previously, this may be used to ensure that a player is not presented with spoilers relating to the video game that they are currently playing.

Generally, the pre-generated image content may be selected in any of the previously described manners (in relation to FIGS. 2 to 5). For example, the selection may be based on a popularity associated with the pre-generated image content, context information associated with the pre-generated image content and/or context information associated with the player, a user input received via a user input means, etc.

At a fifth step S805, at least some of the selected pre-generated image content is displayed. The pre-generated image content is displayed in place of, or in addition to, the video frames detected as corresponding to the loading screen. The pre-generated image content, in the form of e.g. a screenshot, may be displayed so as to occupy the entire display area of a corresponding display device. Alternatively, the pre-generated image content may be displayed so as not to obscure e.g. a progress bar or any other information that a user may still wish to view. In some examples, the pre-generated image content may only be displayed in response to the receipt of a user input confirming that user wishes to view the selected content. Generally, the pre-generated image content may be displayed in any of the manners described previously in relation to FIGS. 2 to 5.

In some examples, the method may further comprise performing optical character recognition (OCR) on at least one of the received frames detected as corresponding to a loading screen so as to extract one or more strings of characters from the at least one video frame detected as corresponding to the loading screen. The OCR process may be performed in any of the previously described manners. Having extracted text from at least one of the loading screen frames, the extracted text may be displayed at a location that at least partially overlaps with the pre-generated image content selected for display. As described previously, the extracted text may be overlaid on top of the pre-generated image content (e.g. screenshot) or at a location above, below, or to the side of the region of the display area occupied by the pre-generated image content.

As mentioned above, in some examples, the machine learning model may be trained (past tense) to detect whether the respective received video frames correspond to a loading screen or gameplay of the video game being played. In such examples, the method may further comprise ceasing display of the pre-generated image content in response to detecting that receive video frames have switched from the loading screen to gameplay. That is, following the detection of a video frame as corresponding to a loading screen, a detection of a subsequent sampled video frame as corresponding to 'gameplay' may cause the pre-generated image content to no longer be displayed. The ceasing of display of the pre-generated image content may be controlled by the control unit described previously, or more generally, a 'SnapShare' application running in tandem to a video game application.

As described previously, training the machine learning model may comprise receiving video frames generated during previous playing of the video game and generating feature representations of the received video frames. The feature representations may then be clustered into respective clusters using unsupervised learning; for example, k-means or mini-batch k-means clustering. Each cluster may then be manually labelled with a label indicating a scene-type associated with the video frames or feature representations associated with that cluster. In order to detect loading screens, at least one of the clusters will need to correspond to 'loading screens' and have a scene-type label that indicates this. The video frames generated during previous playing of the video game or corresponding feature representations, and the corresponding labels, are then input to the machine learning model for training. The machine learning model is then trained, via supervised learning, to learn a relationship between video frames/feature representations and the corresponding labels input to the machine learning model. Once trained, the machine learning model can predict a given label associated with an input video frame or feature representation. In this way, the machine learning model acts as a classifier for video frames corresponding to video game footage.

It is noted that the term "based on" is used throughout the present disclosure. The skilled person will appreciate that this term can imply "in dependence upon", "in response to"

and the like, such that data A being based on data B indicates that a change in data B will lead to a resulting change in data A. Data B may be an input to a function that calculates data A based on data B, for example.

It will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for obtaining image content, the system comprising:
  a receiving unit configured to receive video frames generated during execution of a video game application at a video game playing device;
  a monitoring unit operable to detect at least some of the video frames as corresponding to a loading screen;
  a content unit configured to obtain pre-generated image content for displaying in place of or addition to the at least some of the video frames corresponding to the loading screen;
  a control unit configured to receive an input from the monitoring unit, and in response said input, select pre-generated image content for displaying in place of or in addition to the at least some of the video frames corresponding to the loading screen, wherein the pre-generated image content corresponds to screenshots captured by other users for the same or a different video game application;
  a display unit operable, via a system level software application, to display the selected pre-generated image content in place of or in addition to the at least some of the video frames corresponding to the loading screen; and
  a context unit operable to obtain user context information indicating at least one of: (i) the video game application that video frames received at the input unit correspond to and (ii) a player progress associated with the player engaging in gameplay via the video game application, wherein at least some of the screenshots are associated with screenshot context information indicating at least one of (i) the corresponding video game application in which the screenshots were captured and (ii) a player progress associated with the screenshots, and
  wherein the control unit is configured to select a given one of the screenshots for display content based on a comparison of the user context information obtained for the user and the screenshot context information for at least some of the screenshots.

2. The system according to claim 1, wherein the monitoring unit comprises a machine learning model that has been trained to identify the at least some of the video frames corresponding to the loading screen.

3. The system according to claim 2, wherein the machine learning model has been trained using semi-supervised learning so as to identify different types of scenes that the video frames generated during the execution of the video game application correspond to.

4. The system according to claim 3, wherein the different types of scenes learnt by the machine learning model comprise at least game play and one or more loading screens among which the loading screen is included; and
  wherein the control unit is configured to instruct the display unit to cease displaying the selected pre-generated image content in response to a detection of received video frames corresponding to gameplay.

5. The system according to claim 1, comprising a feature extractor configured to generate a feature representation of the received video frames; and
  wherein the monitoring unit is configured to receive the feature representation of the video frames and to detect the at least some of the video frames as corresponding to the loading screen based on the feature representations input to the monitoring unit.

6. The system according to claim 1, further comprising:
  a text identification unit operable to perform an optical character recognition process on the at least some of the video frames corresponding to the loading screen, and to extract one or more strings of characters detected in the video frames; and
  wherein the display unit is configured to superimpose the extracted one or more strings of characters on top of the pre-generated image content selected for display.

7. The system according to claim 1, further comprising:
  a notification unit operable to receive an input from the monitoring unit, and in response thereto, generate or obtain a notification for displaying in addition to the video frames generated by the video game playing device;
  a user input unit operable to receive a user input indicating that the user has interacted with the notification generated by the notification unit; and
  wherein the display unit is configured to display the pre-generated image content only in response to the user having been detected as interacting with the generated notification.

8. The system according to claim 1 comprising the video game playing device, the monitoring unit being executable at the video game playing device.

9. The system according to claim 1, further comprising:
  a feature extractor for receiving video frames generated during previous gameplay via the video game application;
  a clustering unit operable to receive the feature representation output by the feature extractor and to use unsupervised learning to sort the received feature representations into a plurality of clusters;
  a labelling unit operable to generate labels for the clusters output by the clustering unit based on an input from a user, each label indicating a type of scene associated with the frames or corresponding features representations in a respective cluster;

wherein at least one of the scene-types corresponds to the loading screen; and a training unit configured to train the machine learning model of the monitoring unit, the training unit being configured to determine a relationship between the frames or feature representations input to the machine learning model and the corresponding labels generated by the labelling unit, thereby enabling the monitoring unit to predict a label for the frames or feature representations input to the machine learning model.

10. A method for obtaining image content, the method comprising:

receiving video frames generated during execution of a video game application at a video game playing device;

inputting the received video frames into a monitoring unit operable to detect at least some of the video frames as corresponding to a loading screen;

detecting, based on the output of the trained machine learning model, at least some of the received video frames as corresponding to the loading screen;

selecting pre-generated image content for displaying in place of, or in addition to, the at least some of the video frames corresponding to the loading screen, the pre-generated image content being obtained from a central database or image-hosting platform at which the pre-generated image content is stored, wherein the pre-generated image content corresponds to screenshots captured by other users for the same or a different video game application; and displaying at least some of the selected pre-generated image content, via a system level software application, in place of or in addition to the at least some of the video frames corresponding to the loading screen; and obtaining user context information indicating at least one of: (i) the video game application that video frames received at the input unit correspond to and (ii) a player progress associated with the player engaging in gameplay via the video game application, wherein at least some of the screenshots are associated with screenshot context information indicating at least one of (i) the corresponding video game application in which the screenshots were captured and (ii) a player progress associated with the screenshots, and wherein the selecting includes selecting a given one of the screenshots for display content based on a comparison of the user context information obtained for the user and the screenshot context information for at least some of the screenshots.

11. A non-transitory, machine-readable medium storing computer software, which when executed by a computer, causes the computer to obtain image content by carrying out actions, comprising:

receiving video frames generated during execution of a video game application at a video game playing device;

inputting the received video frames into a monitoring unit operable to detect at least some of the video frames as corresponding to a loading screen;

detecting, based on the output of the trained machine learning model, at least some of the received video frames as corresponding to the loading screen;

selecting pre-generated image content for displaying in place of, or in addition to, the at least some of the video frames corresponding to the loading screen, the pre-generated image content being obtained from a central database or image-hosting platform at which the pre-generated image content is stored, wherein the pre-generated image content corresponds to screenshots captured by other users for the same or a different video game application; and displaying at least some of the selected pre-generated image content, via a system level software application, in place of or in addition to the at least some of the video frames corresponding to the loading screen; and obtaining user context information indicating at least one of: (i) the video game application that video frames received at the input unit correspond to and (ii) a player progress associated with the player engaging in gameplay via the video game application, wherein at least some of the screenshots are associated with screenshot context information indicating at least one of (i) the corresponding video game application in which the screenshots were captured and (ii) a player progress associated with the screenshots, and wherein the selecting includes selecting a given one of the screenshots for display content based on a comparison of the user context information obtained for the user and the screenshot context information for at least some of the screenshots.

* * * * *